EMERY & WILSON.
Plow.
No. 25,817.            Patented Oct. 18, 1859.
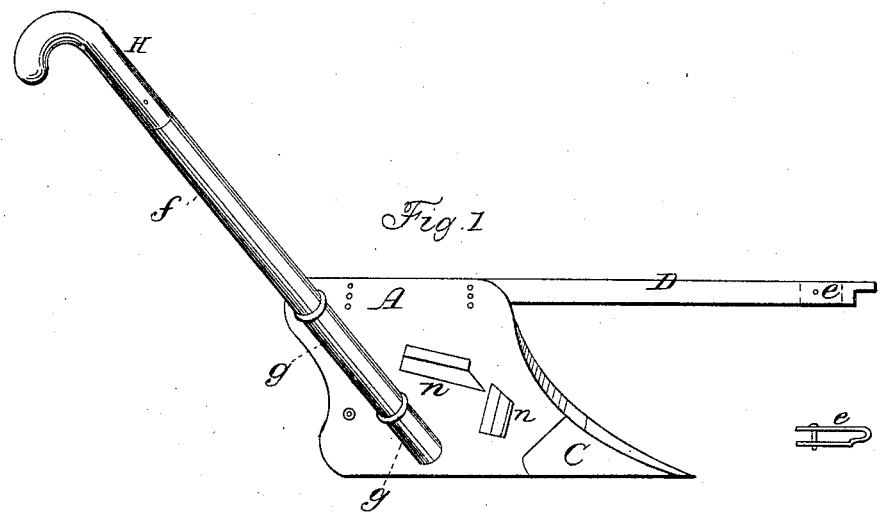
Fig. 1
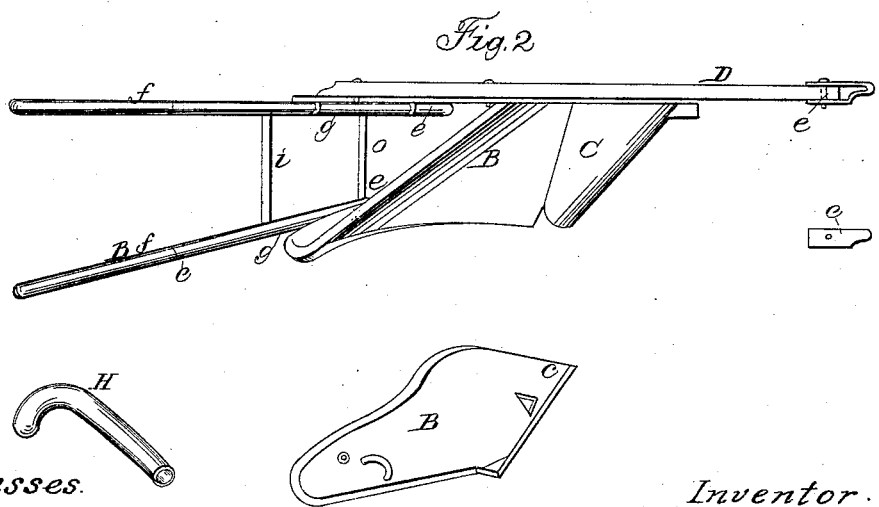
Fig. 2
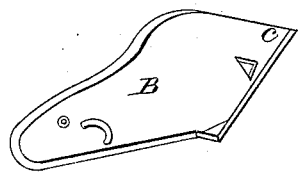
Witnesses.
Mark Wood
Albert F. Wood
Inventor.
Gilmore Emery
Aaron C. Wilson

UNITED STATES PATENT OFFICE.

GILMORE EMERY AND A. C. WILSON, OF NEWFIELD, MAINE.

IMPROVEMENT IN PLOWS.

Specification forming part of Letters Patent No. 25,817, dated October 18, 1859.

*To all whom it may concern:*

Be it known that we, GILMORE EMERY and AARON C. WILSON, both of Newfield, in the county of York and State of Maine, have invented new and useful Improvements on Agricultural Plows, of which the following is a full and accurate description.

The landside A is shown in the accompanying drawings. End of landside makes the colter. Chill hardened on one side. Mold-board B connected with landside A by bolts passing through projections $n$ $n$ on landside and through corresponding ones on inside of moldboard; C, the point; D, the beam, perfectly straight, bolted onto the landside on either side. (Shown in drawings on outside.) Beam can be elevated or depressed at pleasure to regulate the depth of furrow. Handles $ff$ pass through loops. (Shown on landside $g$ $g$ with crook of cast-iron.) H, hollow end of socket, formed to receive the handle, wood. $e$ is the clevis.

Figure 2 shows a top view of plow when together—landside, mold-board, and point of cast-iron.

What we claim as our invention, and desire to secure by Letters Patent, is—

The arrangement of the various parts of the plow, when constructed as herein described, for the purposes set forth.

Newfield, Maine, July 8, 1859.

GILMORE EMERY.
    AARON C. WILSON.

Witnesses:
    EDWARD S. MORRIS,
    JAMES AYER.